(12) United States Patent
Grip (10) Patent No.: US 7,860,382 B2
(45) Date of Patent: Dec. 28, 2010

(54) SELECTING AUTOFOCUS AREA IN AN IMAGE

(75) Inventor: Martin Grip, Forulund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 559 days.

(21) Appl. No.: 11/537,844

(22) Filed: Oct. 2, 2006

(65) Prior Publication Data
US 2008/0080846 A1    Apr. 3, 2008

(51) Int. Cl.
*G03B 17/00* (2006.01)
(52) U.S. Cl. .................... 396/51; 348/333.03
(58) Field of Classification Search .............. 396/51; 348/333.03
See application file for complete search history.

(56) References Cited

U.S. PATENT DOCUMENTS

| | | | |
|---|---|---|---|
| 6,152,563 A | 11/2000 | Hutchinson et al. | |
| 6,191,819 B1 | 2/2001 | Nakano | |
| 6,522,360 B1 * | 2/2003 | Miyawaki et al. | 348/347 |
| 6,806,906 B1 * | 10/2004 | Soga et al. | 348/333.03 |
| 6,812,954 B1 * | 11/2004 | Priestman et al. | 348/14.01 |
| 7,460,150 B1 * | 12/2008 | Coughlan et al. | 348/169 |
| 2001/0005230 A1 * | 6/2001 | Ishikawa | 348/333.03 |
| 2003/0071909 A1 | 4/2003 | Peters | |
| 2005/0073136 A1 | 4/2005 | Larsson et al. | |
| 2005/0175257 A1 * | 8/2005 | Kuroki | 382/278 |
| 2006/0007396 A1 | 1/2006 | Clement et al. | |
| 2006/0062484 A1 | 3/2006 | Aas et al. | |
| 2006/0110008 A1 | 5/2006 | Vertegaal et al. | |

FOREIGN PATENT DOCUMENTS

WO    WO 2005/093510 A2    10/2005

OTHER PUBLICATIONS

International Search Report with Written Opinion for corresponding PCT application No. PCT/EP2007/056365, dated Oct. 24, 2007, 15 pages.
Written Opinion/International Search Report for PCT/EP2007/056307 mailed Oct. 10, 2007, 13 pages.

* cited by examiner

*Primary Examiner*—Clayton E Laballe
*Assistant Examiner*—Fang-Chi Chang
(74) *Attorney, Agent, or Firm*—Harrity & Harrity, LLP (57) ABSTRACT

A system and method are provided for obtaining a gazing direction of a user of an image-capturing device relative to an image of an object to be captured; identifying an area of the image based on the obtained gazing direction; and performing optical focusing for the identified area using an autofocus arrangement of the image-capturing device.

21 Claims, 6 Drawing Sheets

SELECTING AUTOFOCUS AREA IN AN IMAGE

TECHNICAL FIELD OF THE INVENTION

The present invention generally relates to imaging systems and, more particularly, portable communication devices having an imaging system and a method and an arrangement for selecting the focus area in an image in an imaging system.

DESCRIPTION OF RELATED ART

In portable imaging devices, the correct focus of an image can be obtained by means of a so-called autofocus arrangement. For most Digital Still Camera (DSC) purposes, autofocusing arrangements may be considered superior to a manual adjustment of the image focus in terms of speed and accuracy.

Autofocus arrangements are typically based on either an active system or a passive system. The active systems usually involves two steps. Initially, a distance measuring (e.g., based on ultrasonic sound waves, infrared light, or the like) is performed apart from the optical system. Subsequently, a focus adjustment is performed by the optical system based on the measured distance. In contrast, passive systems do not rely on transmissions, or the like (e.g., in the form of electromagnetic rays or sound waves, etc.), from the camera towards the object to be imaged to measure distance. Instead, passive systems use the light that is naturally reflected by the object. A passive autofocusing can be achieved, e.g., by phase detection or contrast measurement.

However, since an entire (multi-depth) viewable image may not be focused on at the same time, a need exists for determining the portion of the viewed image that the user wishes to focused on in the captured image. For this purpose, typical autofocus systems use a viewfinder provided with a single focusing frame within the viewfinder, or the like, that has to be directed on the portion of the image on which the lens is to be focused. If the focus frame is aimed otherwise, it is uncertain that the desired object will be in focus in the captured image. Given that the focus frame is typically centered in the viewfinder, however, typical focus frames do not allow the focus of the image on an object that is located outside the image center, i.e. located in the periphery of the image.

As an alternative to the single, centered focusing frame, some current viewfinders are provided with a plurality of focusing frames associated with designated areas within the viewfinder which may be used for focusing on a portion of an image. The focus of the image may be set, for example, at a fixed location within the viewfinder corresponding to the middle, the right side, left side, the top, or the bottom, etc., of the viewfinder. However, only one of the settings may be used. The setting is often selected automatically, for example, typically on the object closest to the camera in the focusing area.

Accordingly, it would be beneficial to provide a portable imaging device that may ascertain the user's desire to focus on a particular portion of a viewed image. In particular, it would be beneficial to provide a simple, flexible, and intuitive focusing process that requires substantially no input from the user. Even more particularly, it would be beneficial to provide such an improved focusing without having to add auxiliary hardware for accomplishing the improvement.

SUMMARY OF THE INVENTION

Implementations consistent with the principles of the present invention are directed to providing a user of a portable imaging device with an efficient and flexible procedure for focusing an image at a desired area of interest. In particular, some implementations are intended to provide a simple, flexible, and intuitive focusing procedure which requires few or no additional actions by the user.

One implementation provides a method that may include obtaining a gazing direction of a user of an image-capturing device relative to an image of an object to be captured; identifying an area of the image based on the obtained gazing direction; and performing optical focusing for the identified area using an autofocus arrangement of the image-capturing device.

Additionally, the gazing direction may be toward a display of the image on the image-capturing device.

Additionally, the gazing direction may be toward the object.

Additionally, the method may include locating, based on the obtained gazing direction, a displaceable focusing frame relative to the image as rendered by the image-capturing device.

Additionally, the identified area may define the focusing frame.

Additionally, the method may include altering a size of the focusing frame based on input from the user.

Additionally, the focusing frame may be perceptible to the user.

Additionally, the method may include altering a shape of the focusing frame based on input from the user.

Additionally, the method may include capturing the image when the focusing frame is stationary for a predetermined amount of time.

Additionally, the performing the optical focusing may be accomplished without additional input from the user.

In another implementation, an apparatus may include a first imaging device to capture a partial image of a user of the apparatus; a second imaging device to capture an image of at least one object, the second imaging device including an autofocus arrangement; and an autofocus-control for focusing the second imaging device on the captured image, wherein the autofocus-control is configured to determine a direction in which the user is looking based on the partial image, identify an area of interest associated with the image based on the determined direction; focus the second imaging device on the identified area of interest using the autofocus arrangement.

Additionally, the autofocus-control may be configured to determine the direction when the user looks directly at the object.

Additionally, the apparatus may include a display for displaying the captured image, wherein the autofocus-control is configured to determine the direction when the user views the captured image via the display.

Additionally, the apparatus may include a focusing indicator disposed on the display, wherein the autofocus-control is configured to position the focusing indicator relative to the captured image and corresponding to the identified area of interest.

Additionally, the autofocus-control may be configured to determine the direction based on a position of at least one eye of the user from the partial image.

Additionally, the autofocus-control may be configured to alter at least one property of the focusing indicator based on an input received by the user.

Additionally, the focusing frame may be perceivable by the user.

Additionally, the apparatus may be a portable communication device.

Additionally, the first imaging device may be further configured to record images of the user to be provided during a video-call.

In a further implementation, a computer-readable medium may contain instructions for execution on a processor, the instructions to cause: a first image recording arrangement to record images of an user of a device; a second image recording arrangement, including an autofocus arrangement, to record images of viewable surroundings; and a display arrangement for reproducing the recorded images of the viewable surroundings; and an autofocus-control to: obtain a gazing direction of the user based on the images of the user; identify an area of interest in the image rendered via the display based on the obtained gazing direction; focus the recorded image of the viewable surroundings using the autofocus arrangement so that visual acuity associated with an object within the identified area of interest is increased.

In yet another implementation, a computer-readable medium executable on a portable device may include instructions to cause a first image recording arrangement to record images or video sequences of a visage of a user of the device; instructions to cause a second image recording arrangement to record images or video sequences of environs of the user; instructions to cause a display arrangement to reproduce the recorded images or video sequences of the environs; and instructions to cause a control to focus within the recorded images or video sequences in the device by: obtaining a gazing direction of the user from the images or video sequences recorded by the first image recording arrangement; identifying an area of interest in an image or a video sequence rendered via the display based on the obtained gazing direction; automatically focusing the area of interest within the recorded image or video sequence of the environs.

Further advantages of the present invention and embodiments thereof will appear from the following detailed description of the invention.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

Implementations of the present invention relate to devices having an imaging or image capturing system. In particular, the invention relates to portable communication devices comprising an imaging system. However, the invention is by no means limited to communication devices. Rather, it can be implemented in any suitable portable device having a suitable imaging system.

Figure 1:
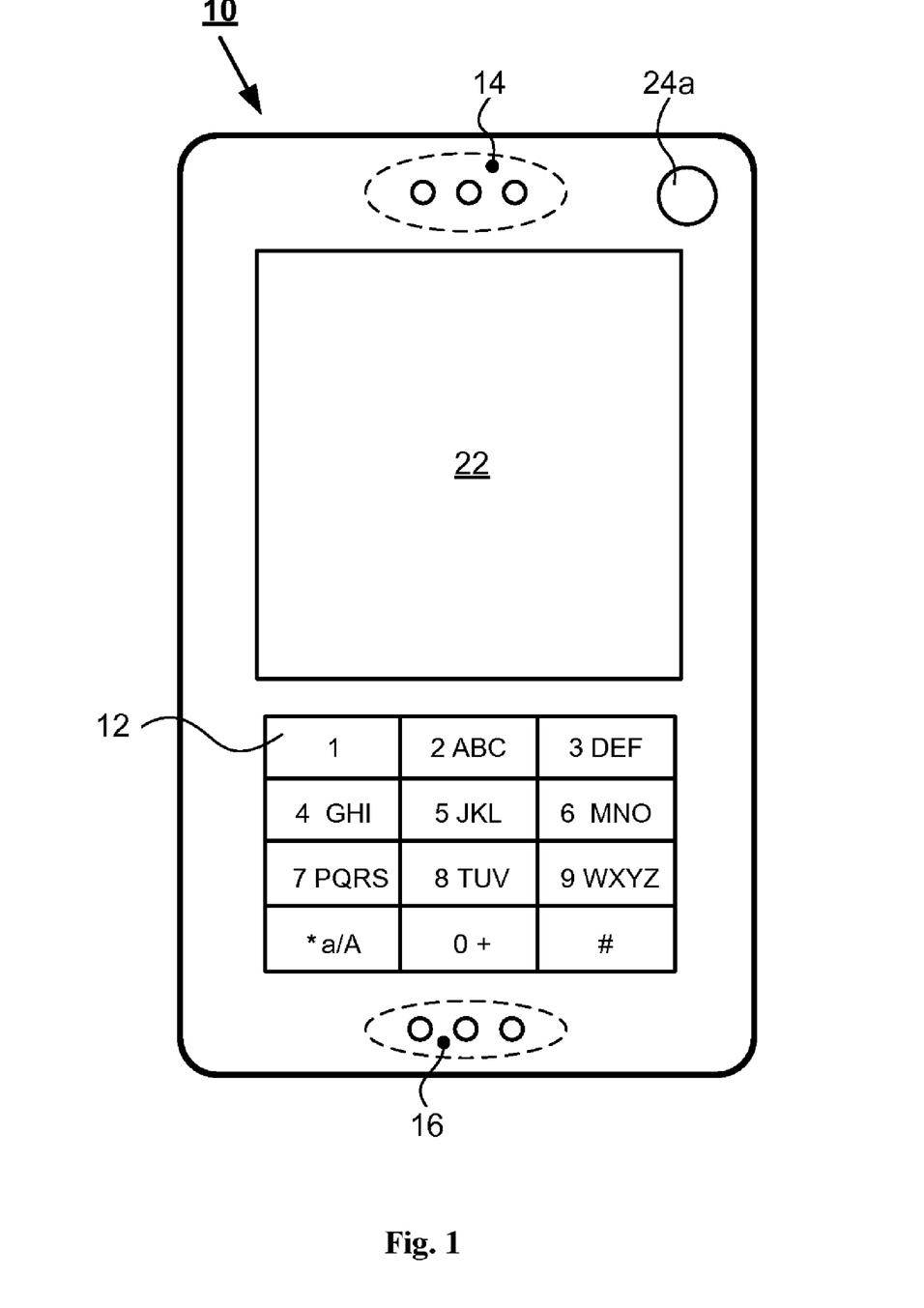
FIG. 1 shows one side of a portable communication device in the form of a cell phone.
Figure 2:
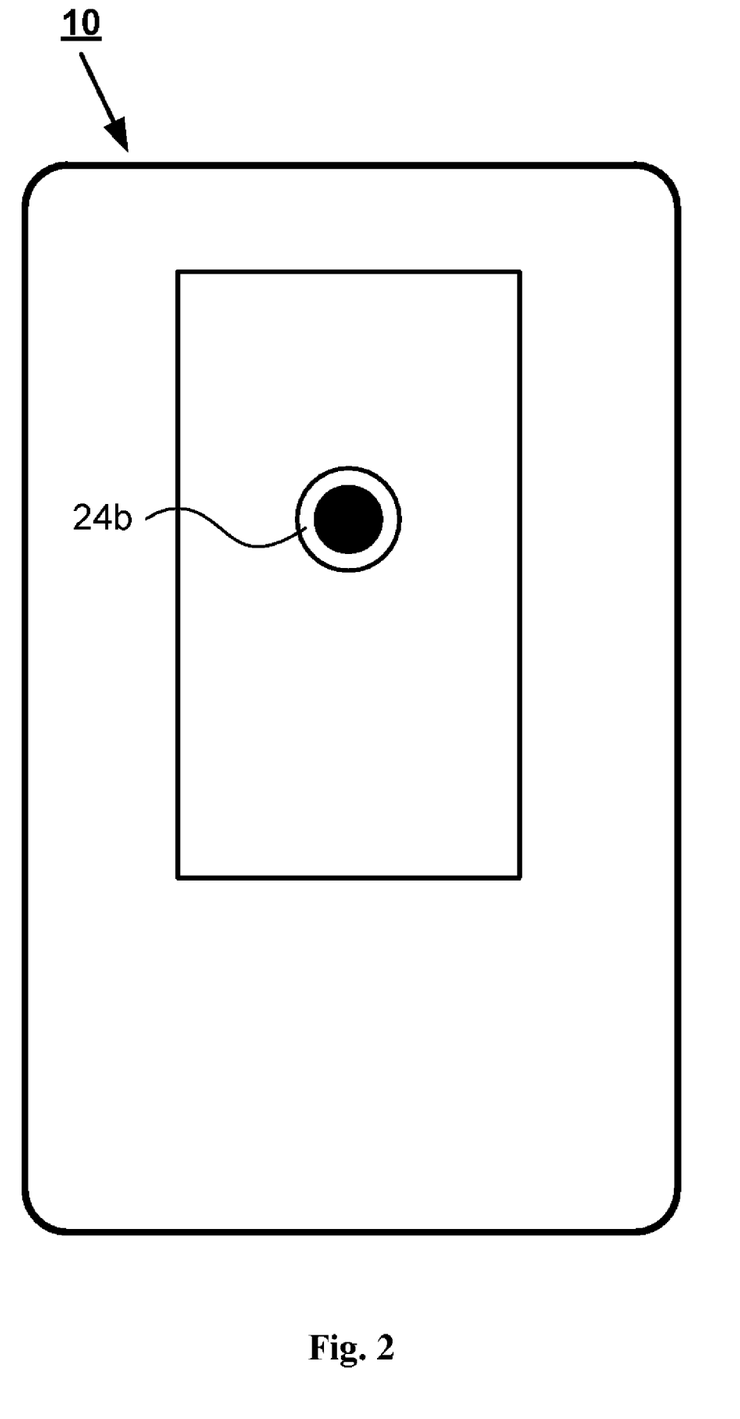
FIG. 2 shows another side of the portable communication device in FIG. 1.

A portable communication device according to a preferred embodiment of the invention is shown in FIG. 1-2. The device is preferably a mobile cell phone 10 adapted, for example, to operate according to 3G-technology (e.g., W-CDMA or CDMA2000), 2.5-technology (e.g., GPRS), or other type of technology. Information about 3G-technology and 2.5-technology can be found in specifications from the $3^{rd}$ Generation Partnership Project (3GPP) (see, e.g., www.3gpp.org).

FIG. 1 shows a first side of cell phone 10 that may include a keypad 12, a speaker 14, and/or a microphone 16. Keypad 12 may be used for entering information such as selection of functions, responding to prompts, and the like. Keypad 12 may be of any suitable kind, including, but not limited to, keypads with suitable push-buttons, touch-buttons, or the like, and/or a combination of different suitable button arrangements. Speaker 14 may used to present sounds to a user. Microphone 16 may used to receive audible input from a user. In addition, cell phone 10 may include an antenna(s), which may be used to communicate via a (wireless) network. The antenna may in-built in cell phone 10.

Moreover, cell phone 10 shown in FIG. 1 may include a display 22 to display functions and prompts to a user of cell phone 10. Display 22 may be used to present images and/or video sequences. It will be appreciated that display 22 may be configured to present stored images and/or video sequences for viewing as well as images to be captured and/or stored. In other words, display 22 may be configured to operate both as a viewfinder and as presentation device for previously recorded images and/or video sequences.

In addition, cell phone 10 shown may include an image capturing device, camera 24a for enabling images and/or video sequences to be digitally recorded by cell phone 10. Camera 24a may include a lens and/or a lens system and an image sensor, such as an CCD (charged couple device) image sensor built on an integrated circuit containing an array of linked, or coupled, capacitors sensitive to the light. Other types of image sensors may be used, e.g., an APS (active pixel sensor) built on an integrated circuit containing an array of pixels, each containing a photo detector as well as three or more transistors. The APS can be produced by an ordinary CMOS process and may consume less power that the typical CCD. Camera 24a may be a video-call camera for recording images and/or video sequences in a direction of the user of cell phone 10 during a video-call, for example, as is commercially available in the Sony-Ericsson mobile cellular phones P990i, W850i, K610i, and Z610i., as well as others.

FIG. 2 shows another (opposing) side of cell phone 10 that includes another image-capturing device, camera 24b. Camera 24b may include the same or similar basic structures and functions as the camera arrangement 24a. However, camera 24b may function as the featured camera of cell phone 10, and camera 24b may include different performance qualities, e.g., high resolution, etc. In particular, camera 24b may be provided with an autofocus arrangement or the like to achieve focusing of an image to be recorded.

It will be appreciated that cell phone 10 in FIGS. 1 and 2 is an exemplary portable communication device in which the principles of the invention can be implemented. In addition, the invention may, for instance, be used in a PDA (personal digital assistant), a palm top computer, a lap top computer or a smartphone or any other suitable portable device.

Figure 3:
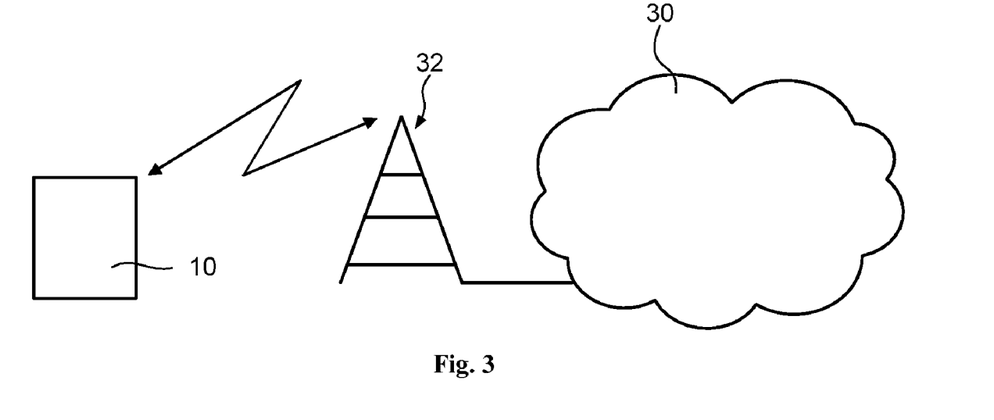
FIG. 3 shows the cell phone in FIG. 1-2 connected to a cellular network.

FIG. 3 shows cell phone 10 connected to a cellular network 30 via a base station 32. Network 30 may include a 3G network, such as a WCDMA network, a GPRS network, any other 2.5G or 2.75G network. Network 30 may include some other type of network, such as Internet, a corporate intranet, a LAN or a wireless LAN. Network 30 may provide any suitable platform or have any suitable architecture, for example, wired or wireless.

Figure 4:
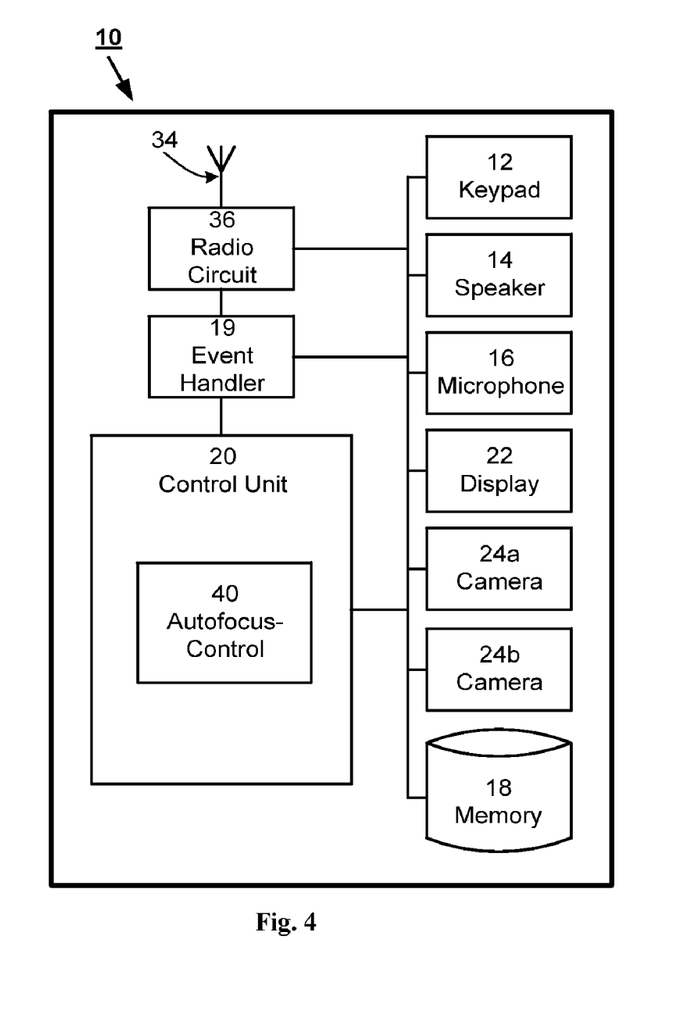
FIG. 4 shows a schematic block diagram of the relevant parts of the cell phone in FIG. 1-3.

FIG. 4 shows a functional block diagram of cell phone 10. As noted above, cell phone 10 may include keypad 12, speaker 14, microphone 16, display 22, a camera 24a, and/or camera 24b. In addition, cell phone 10 may include a memory 18, for example, for storing data files. Data files may include files including images and/or video sequences produced by camera arrangement 24b, for example. Memory 18 may be any suitable memory type used in electronic devices.

In addition, cell phone 10 may include an antenna 34 that connects to a radio circuit 36 for enabling radio communication via network 30 or directly with another device. Radio circuit 36 may connect to an event handling unit 19 for handling events, such as outgoing and incoming communication to and from external units via network 30, e.g., calls and messages, e.g., SMS (Short Message Service) and MMS (Multimedia Messaging Service), or other types of communication events.

Cell phone 10 may include a control unit 20 for controlling and supervising operation of cell phone 10. The control unit 20 may be implemented by means of hardware and/or software, and it may include one or several hardware units and/or software modules, e.g., one or several processor units provided with or having access to the appropriate software and hardware required for the functions required by cell phone 10. As can be seen in FIG. 4, control unit 20 may connect to keypad 12, speaker 14, microphone 16, event handling unit 19, display 22, cameras 24a and 24b, radio unit 36, and/or memory 18. Control unit 20 may control and communicate with connected units, for example, to exchange information with and/or provide instructions to the units.

Control unit 20 may include, an autofocus-control 40. Autofocus-control 40 may be implemented by means of hardware and/or software and it may include one or several hardware units and/or software modules, e.g., one or several processor units provided with or having access to the software and hardware appropriate for the functions required. Autofocus-control 40 may be configured to operatively control the autofocus process of camera 24b, for example, by means of sensing a position of an eye(s) of a user 50 (FIG. 5) by camera 24a, as will be described in more detail below.

Figure 5:
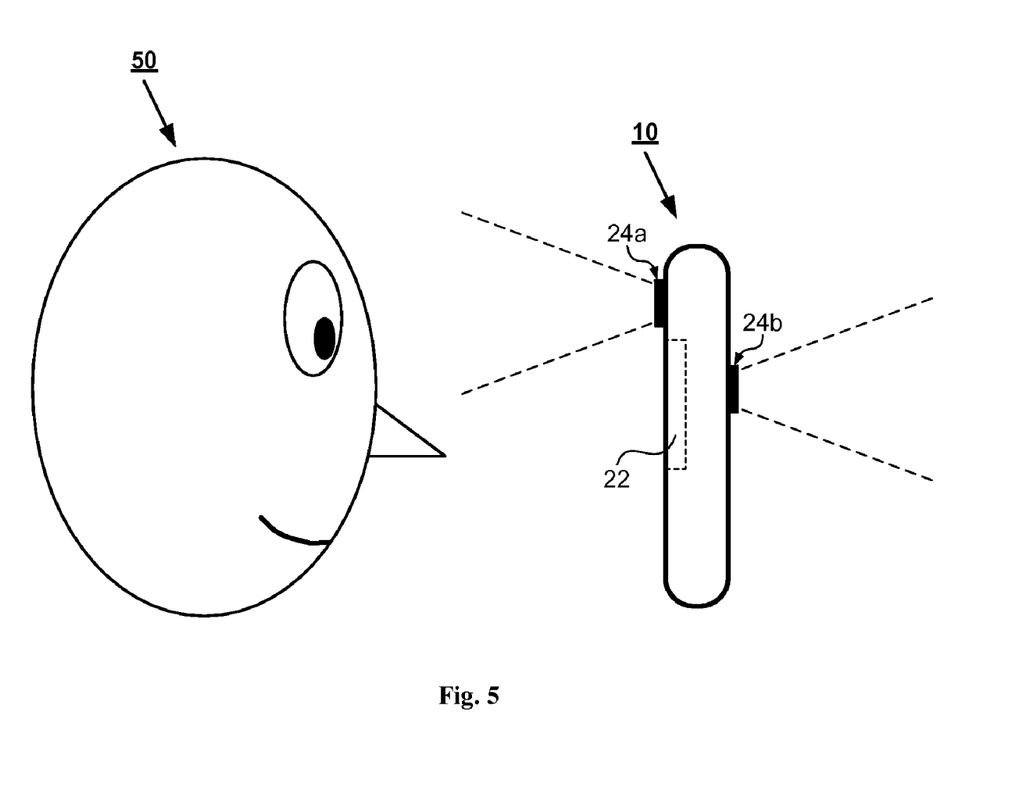
FIG. 5 shows a user utilizing the cell phone in FIG. 1-3.

FIG. 5 shows the head of user 50 using cell phone 10 according to an implementation consistent with the principles of the present invention. As can be seen in FIG. 5 cell phone 10 may be maintained in an operational position facing the user 50. The operational position may be selected so that camera 24a may detect and/or record images and/or video sequences of the eyes of user 50 relative to display 22, which in operation may reproduce (i.e., display) an image provided by camera 24b.

Autofocus-control 40 may be configured to operatively process detected images of the eyes of user 50 captured by camera 24a so as to determine a gazing direction of user 50, from a general to a pin-point accuracy. This can be accomplished, for example, by means of a suitable gaze tracking algorithm or the like, which may for example, detect changes in eye position (i.e., eye movement) relative to a displayed image. Autofocus-control 40 may be configured, for example, to control the autofocus arrangement of camera 24b so as to change the focus of the image to be recorded by camera 24b based on the determined gazing direction of user 50 by means of images provided by camera 24a.

Figure 6A:
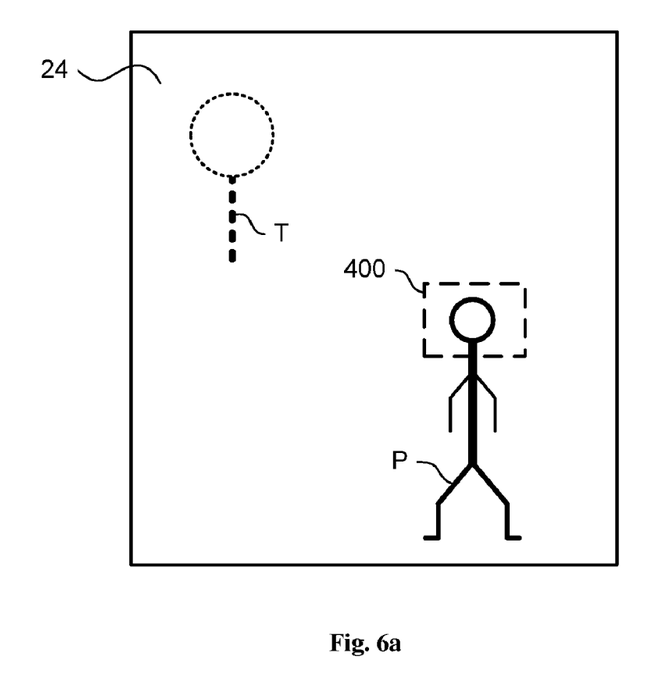
FIG. 6a shows the display of the cell phone in FIG. 1-3 reproducing an exemplifying and schematic image.
Figure 6B:
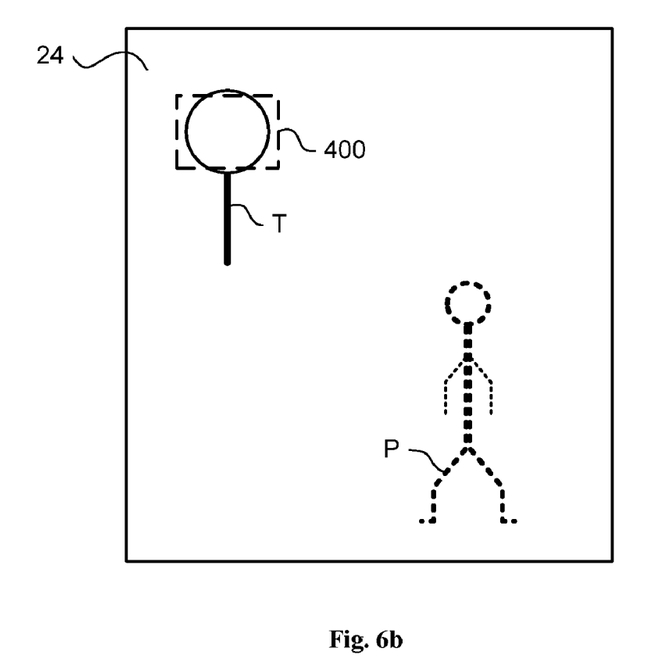
FIG. 6b shows the display of the cell phone in FIG. 1-3 reproducing an exemplifying and schematic image.

For example, as depicted in FIGS. 6a and 6b, cell phone 10 may operate by means of a displaceable focusing region, such as a focusing frame 400, or other positionable designated focusing area. Focusing frame 400 may be visible or otherwise perceivable to user 50 thereby indicating the portion of the displayed image on which the captured image will appear to be focused. The representation of focusing frame 400 may be made apparent to user 50 using any suitable visual effects, e.g., outlining, highlighting, shading, superposition, etc., to provide a user with control over the focusing process. The focusing frame 400 may have the shape of a square or a rectangle or any other polygonal shape. Other regular and/or irregular shapes may be used, e.g., a circle or an oval or a polygonal shape with rounded or slanted corners. In one implementation, focusing frame 400 may be provided without a graphic representation of a defined perimeter. That is, focusing frame may be represented a dot or other symbol (indicator) that indicates a central point of focusing frame 400. Focusing frame 400 may encompass any portion of the displayed image, for example, less than half of the area of the displayed image, and less than 25% of the area of the displayed image, less than 10% of the area of the displayed image, and/or any other fraction of the displayed image, and may vary, for example, based on a depth variance among objects in the displayed image. In one implementation, any one or more properties of focusing frame 400 may be configured by user 50, for example, by selections received by user 50.

In one implementation, a relative size or other dimension of focusing frame 400 may be altered using commands received from user 50, e.g., by inputs received from the buttons or similar on keypad 12 of cell phone 10. This makes it possible to focus on a small object by using a small frame and to focus on a large object or several small objects by using a larger frame. In short, it enables an adjustment of or modification to the size of the are defined by focusing frame 400 to correspond to the object(s) to be focused.

Autofocus-control 40 may be configured to operatively locate focusing frame 400 to various positions in display 22 based on a location of the object(s) upon which the eye(s) of user 50 is fixed at any given point in time. As mentioned above, the gazing direction for user 50 can be ascertained using a suitable gaze tracking algorithm or the like for analysing the user's eyes relative to in images captured camera 24a and rendered to user 50 via display 22. Once the focusing frame 400 is positioned using the acquired gaze information, the image rendered via display 22 may be focused by the autofocus arrangement of camera 24b, for example, as controlled by autofocus-control 40 processing the object(s) within focusing frame 400.

It will be appreciated that in addition to the components and units shown in FIG. 3, cell phone 10 may include further parts and units, or the like. The components and units shown in FIG. 3 may connect to more components and units in alternative configurations than what is illustrated.

Figure 7:
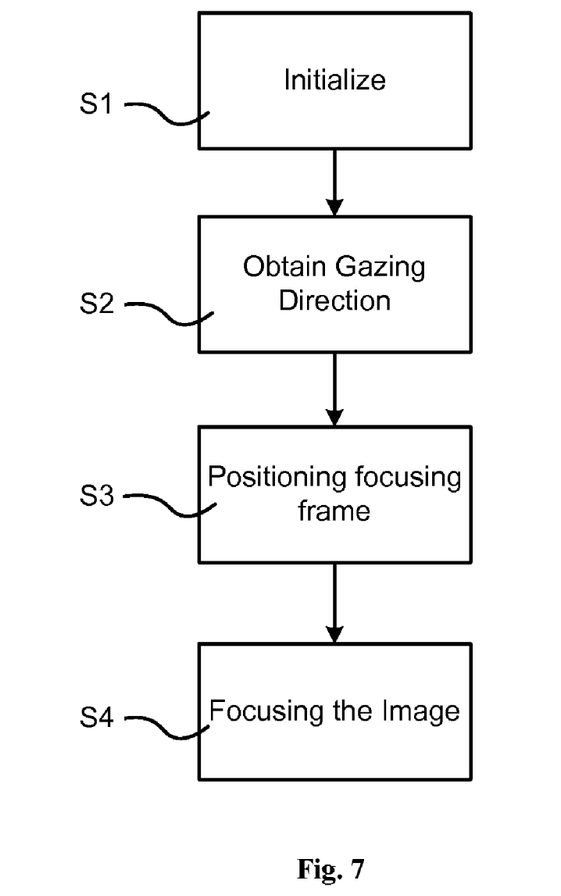
FIG. 7 shows a flow chart of an exemplary method according to an implementation.

An exemplary implementation will be described with reference to FIGS. 1-5, together with FIGS. 6a and 6b depicting display 22 including a schematic representation of a displayed image, and FIG. 7 showing a flow chart of an exemplary implementation of a method according to the invention.

As discussed above, cell phone 10, in one implantation, may include camera 24a that may function to record images and/or video sequences in a direction of user 50, for example, during a video-call. In addition, cell phone 10 may include camera 24b for recording (high-quality) images and/or video sequences of the environment surrounding cell phone 10. In particular, as will be explained in more detail below, camera 24b may be provided with an autofocus arrangement configured to be operatively controlled by the autofocus-control 40 based on the displayed area within display 22 upon which an eye(s) of user 50 is trained as determined by using information from camera 24a.

FIGS. 6a and 6b illustrate display 22 of cell phone 10 presenting an exemplary and schematic image rendered from information received from camera 24b. The image comprises a schematically illustrated person P in a near position relative to cell phone 10 (i.e., in the foreground), and a schematically illustrated tree T in a distant position relative to cell phone 10 (i.e., in the background). FIG. 6a shows focusing frame 400 positioned so as to substantially encompass a head region of person P, which is indicative that the image according to the exemplary implementation will be focused so as to place the face of the person P in (optical) focus in contrast with the image of tree T. FIG. 6b shows focusing frame 400 alternately positioned so as to substantially encompass the crown of tree T, which is indicative that the image according to the exemplary implementation will be focused so as to place the crown of tree T in (optical) focus in contrast with the image of person P. Hence, by relocating the frame 400 over various portions of the image presented on display 22, i.e., to different positions in the presented image, focusing on desired Additionally, s of the displayed the image may be accomplished without requiring any additional actions on the part of user 50.

An advantage provided by some implementations is that a user of the mobile communication device is given a greater degree of control over the focusing of the image. Hence, the user is not burdened with additional aiming and/or maneuvering to achieve the desired focusing, and the user is not limited to a choice (manual or automatic) between a small number of predetermined, fixed-location focusing frames. Rather, according various implementations, the user may aim camera 24b of cell phone 10 so as to capture the image to be recorded. The captured image may be focused as a result of the user gazing at an area(s) of interest in the captured image rendered via display 22. This provides simple and convenient focusing that may be accomplished incidentally to capturing an image in the normal course.

Advantageous implementations of the present invention use a communication device provided with two cameras, which e.g., in a cell phone enabled for video-calls. An exemplary advantage is that an implementation of the invention in a communication device enabled for video-calls by means of two cameras does not require any auxiliary hardware (at least not an auxiliary camera), i.e., the necessary hardware may already be in place.

The steps in an exemplifying method of focusing an captured image by means of the autofocus arrangement of camera 24b utilizing recordings of the eye(s) of user 50 made by camera 24a for positioning a displaceable focusing frame, located at a portion of a captured image rendered via display 22, will now be described with reference to the exemplifying flow chart in FIG. 7. The method is preferably implemented by means of the autofocus-control 40 as schematically illustrated in FIG. 4.

In a first step S1 of an exemplary method according to an implementation of the present invention, the focusing function preformed by the autofocus-control 40 is initialized. The initialization may include actions, such as recording an image or a video sequence of user 50 by using information provided by camera 24a, recording an image or a video sequence of the environment surrounding cell phone 10 by using camera 24b, and reproducing the recorded images or video sequences of the surrounding environment via display 22. In one implementation, initialization may include an allocation of focusing frame 400 on a start position in the image displayed via display 22.

In a second step S2 of the exemplary method, the gazing direction of user 50 may be determined by autofocus-control 40 being arranged to operatively process images or video sequences of the eye(s) of user 50 recorded by camera 24a. The recorded images of the eye(s) of user 50 may be processed by autofocus-control 40 using a suitable gaze tracking algorithm, or the like. For this purpose, any of a number of gaze tracking techniques may be used, see e.g. the U.S. Pat. No. 6,152,563 (Hutchinson et. al) and US Published Patent Application Nos. 2006/0110008 A1 (Vertegaal et al.) and 006/0007396 A1 (Clement et al). Those skilled in the art, having the benefit of this disclosure, recognizes similar or equivalent methods suitable for tracking the gaze direction of user 50 using recordings from camera 24a. It should be appreciated that user 50 may gaze at display 22 reproducing the scenery currently recorded by camera 24b or, alternatively, gaze at the scenery directly as it appear in the environment surrounding cell phone 10. Referring to FIG. 6a, for example, user 50 may either gaze indirectly at person P or at tree T displayed via display 22, or gaze directly at person P or at tree T as the objects appear in the environment surrounding cell phone 10. In either event, a gaze tracking algorithm, or the like, may detect a direction of user's 50 gaze to varying degrees of precision, for example, from general to pin-point accuracy, and focusing frame 400 may be moved accordingly irrespective of the precision with which the user's 50 gaze is perceived.

In a third step S3 of the exemplary method, focusing frame 400 may be moved according to the gazing direction of user 50 obtained in the previous step, i.e., relocated to the general area of the object of interest in the image or video sequence reproduced via display 22. Focusing frame 400 may be caused to move by autofocus-control 40. However, autofocus-control 40 may alternatively provide another hardware and/or software unit with the obtained gazing direction, which unit in turn may direct focusing frame 400 to reposition within the image or video sequence reproduced via display 22 according to the received gazing direction information.

In a fourth step S4 of the exemplary method, the object of interest that is identified by focusing frame 400 is selected, e.g., in that user 50 pushes a button or the like on keypad 12 or image-capturing device, or in that focus frame 400 remains stationary for a predetermined amount of time irrespective of whether an input is received from user 50. Autofocus-control 40 may use the part of the image delimited by the focusing to focus the image or video sequence so that the object(s) within focusing frame 400 becomes sharper or visually acute. This may be performed, for example, by selecting the focus setting that renders a desired degree of sharpness within focusing frame 400, which may be performed in the normal course in a digital camera having conventional autofocus functions. For this purpose, the image associated with focusing frame 400 can be analyzed by means of, for example, an edge detection algorithm according to which the autofocus setting that shows most edges within frame 400 may be selected to focus the image as representative of or associated with the sharpest image obtainable, c.f., e.g., U.S. Published Patent Application No. 2006/0062484 A1 (Aas et. al).

Figure 8:
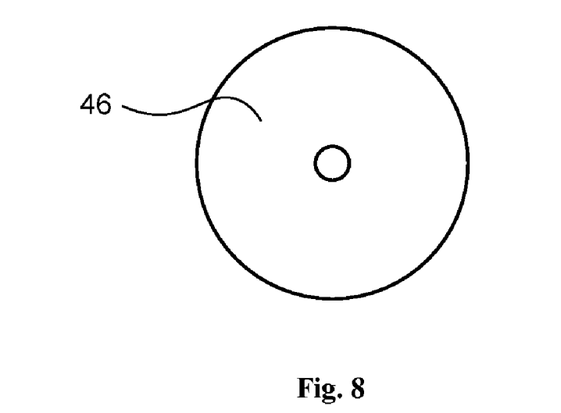
FIG. 8 shows a CD ROM on which program code for executing the method according to the invention is provided.

In general, as previously explained, autofocus-control 40 may be configured to perform the exemplary method described above, as provided in the form of one or more processors with corresponding memory containing the appropriate software in the form of a program code. However, the program code can also be provided on a data carrier such as a CD ROM disc 46 as depicted in FIG. 8 or an insertable memory stick, which may perform implementations of the invention when loaded into a computer or into a phone having suitable processing capabilities. The program code can also be downloaded remotely from a server either outside or inside the cellular network or be downloaded via a computer, like a PC, to which the phone is temporarily connected.

The present invention has now been described with reference to exemplifying embodiments. However, the invention is not limited to the embodiments described herein. On the contrary, the full extent of the invention is only determined by the scope of the appended claims.

What is claimed is:

1. A method, performed by a mobile phone comprising a video-call camera arrangement to record images or video sequences of an eye of a user of the mobile phone, in a first operational mode for obtaining gazing directions of the user and, in a second operational mode, for providing images or video sequences of the user during a video-call; and an image-capturing camera arrangement, including an autofocus arrangement, for recording images or video sequences of an environment surrounding the mobile phone, the method comprising:
    recording, by the image-capturing camera arrangement, an image or video sequence of the environment;
    reproducing, by a display arrangement of the mobile phone, the recorded image or video sequence of the environment;
    recording, by the video-call camera arrangement in the first operational mode, images or video sequences of the eye of the user;
    obtaining a gazing direction of the user, relative to the reproduced recorded image or video sequence of the environment, from the recorded images or video sequences of the eye of the user;
    selecting a focusing area in the reproduced image or video sequence, based on the obtained gazing direction; and
    focusing the recorded image or video sequence of the environment, using the autofocus arrangement, to sharpen the recorded image or video sequence within the selected focusing area.

2. The method of claim 1, where the gazing direction is toward the display arrangement.

3. The method of claim 1, where the gazing direction is toward the object.

4. The method of claim 1, further comprising:
    locating, based on the obtained gazing direction, a displaceable focusing frame relative to the reproduced image or video sequence.

5. The method of claim 4, where the selected focusing area defines the focusing frame.

6. The method of claim 4, further comprising:
    altering a size of the focusing frame based on input from the user.

7. The method of claim 4, where the focusing frame is perceptible to the user.

8. The method of claim 4, further comprising:
    altering a shape of the focusing frame based on input from the user.

9. The method of claim 4, further comprising:
    capturing the reproduced image or video sequence when the focusing frame is stationary for a predetermined amount of time.

10. The method of claim 1, where the focusing is accomplished without additional input from the user.

11. A mobile phone comprising:
    a video-call camera arrangement to record an image or video sequence of a an eye of a user of the mobile phone, in a first operational mode for obtaining gazing directions of the user and, in a second operational mode, for providing images or video sequences of the user during a video-call;
    a image-capturing camera arrangement to record an image or video sequence of at least one object in an environment surrounding the mobile phone, the image-capturing camera arrangement including an autofocus arrangement;
    a display arrangement to reproduce the recorded image or video sequence of the at least one object; and
    an autofocus-control to:
        determine a gazing direction of the user, relative to the reproduced recorded image or video sequence of the at least one object, based on the recorded image or video sequence of the eye of the user,
        select a focusing area within the reproduced image or video sequence based on the determined gazing direction, and
        focus the recorded image or video sequence of the environment, using the autofocus arrangement, to sharpen the recorded image or video sequence of at least one object appearing within the selected focusing area.

12. The mobile phone of claim 11, where the autofocus-control determines the gazing direction based on the user looking directly at the at least one object.

13. The mobile phone of claim 11, where the autofocus-control determines the gazing direction based on the user viewing the display arrangement.

14. The mobile phone of claim 13, further comprising:
    a focusing indicator disposed on the display arrangement, where the autofocus-control positions the focusing indicator based on the determined gazing direction.

15. The mobile phone of claim 14, where the autofocus-control determines the gazing direction based on a position of at least one eye of the user using the recorded image or video sequence of the eye of the user.

16. The mobile phone of claim 14, where the autofocus-control alters at least one property of the focusing indicator based on an input received by the user.

17. The mobile phone of claim 14, where the focusing indicator is perceivable by the user.

18. The mobile phone of claim 11, where the video-call camera arrangement records images of the user provided during the video-call.

19. The mobile phone of claim 11, where the image-capturing camera arrangement records the image or video sequence of the at least one object only when the selected focusing area remains substantially fixed for a predetermined amount of time.

20. A computer-readable medium containing instructions for execution on a processor, the instructions to cause:
    a video-call camera arrangement to record images or video sequences of the eye of a user of a mobile phone, in a first operational mode for obtaining gazing directions of the user and, in a second operational mode, for providing images or video sequences of the user during a video-call;

a image-capturing camera arrangement, including an autofocus arrangement, to record images or video sequences of viewable surroundings of the mobile phone; and a display arrangement to reproduce the recorded images or video sequences of the viewable surroundings; and an autofocus-control to:
  obtain a gazing direction of the user, relative to the reproduced recorded images or video sequences of the viewable surroundings, based on the recorded images or video sequences of the user,
  identify a focusing area in the reproduced image or video sequence based on the obtained gazing direction, and
  focus the recorded images or video sequences of the viewable surroundings using the autofocus arrangement so that visual acuity associated with an object within the identified focusing area is increased.

21. A computer-readable medium executable on a mobile phone, the computer-readable medium comprising:

instructions to cause a video-call camera arrangement to record images or video sequences of a visage of a user of the mobile phone, in a first operational mode for obtaining gazing directions of the user and, in a second operational mode, for providing images or video sequences of the user during a video-call;

instructions to cause a image-capturing camera arrangement to record images or video sequences of environs of the user; and instructions to cause a display arrangement to reproduce the recorded images or video sequences of the environs; and instructions to cause a control to focus within the recorded images or video sequences in the mobile phone by:
  obtaining a gazing direction of the user, relative to the reproduced recorded image or video sequence of the environs, from the images or video sequences recorded by the video-call camera arrangement;
  identifying an area of interest in a reproduced image or video sequence based on the obtained gazing direction; and
  automatically focusing in on the area of interest within the recorded image or video sequence of the environs.

* * * * *